June 14, 1932.  A. J. M. GARNIER  1,863,105
SUPPORTING DEVICE FOR VEHICLES
Filed May 22, 1931  2 Sheets-Sheet 1

A. J. M. Garnier
INVENTOR

By: Marks & Clerk
ATTYS.

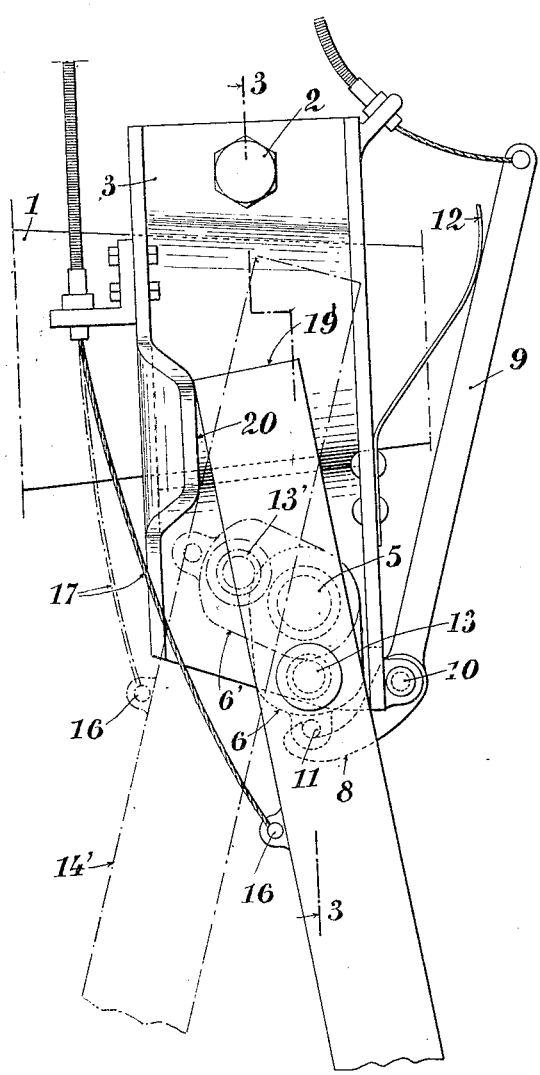
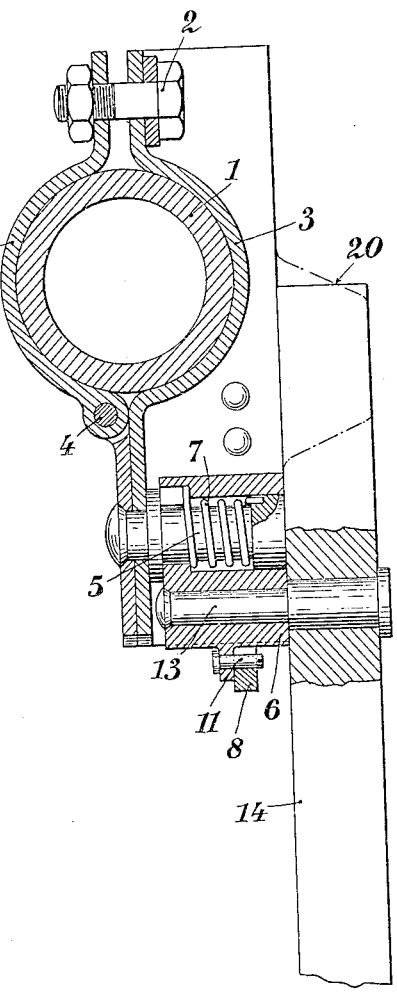

Patented June 14, 1932

1,863,105

UNITED STATES PATENT OFFICE

ABEL JEAN MARIE GARNIER, OF SAINT-OUEN, FRANCE, ASSIGNOR TO ARSENE VALLET, OF PARIS, FRANCE

SUPPORTING DEVICE FOR VEHICLES

Application filed May 22, 1931, Serial No. 539,402, and in France June 25, 1930.

My invention has for its object a device making it possible on the one hand to maintain at a certain distance from the ground one or several wheels of an automobile or other vehicle, said wheel or wheels having been previously lifted through any suitable means such as a jack or the like, and on the other hand to bring said wheel or wheels back to the ground without necessitating the help of any other apparatus.

According to my invention, said device comprises a crutch or support which is pivoted in a permanent way at a suitable point of the vehicle, in the vicinity of the wheel to be maintained in a raised position or at a point equally distant from the wheels that are to be maintained in a raised position.

Of course, said crutch may be pivoted to the vehicle at any point thereof (frame, wheel axle, spring, axle, and so on).

According to a preferred embodiment, said crutch is pivotally mounted in a vertical plane at right angles to the longitudinal plane of the vehicle.

Said crutch might also be secured to the vehicle through a ball and socket joint allowing it to oscillate in any plane whatever.

Preferred embodiments of my invention will be hereinafter described with reference to the appended drawings, given merely by way of example, and in which:

Fig. 2 is a front view at an enlarged scale of the joint and of the arrangement through which said crutch is actuated;

Fig. 3 is a vertical cross section at right angles to the axle, on the line 3—3 of Fig. 2.

Figure 1:
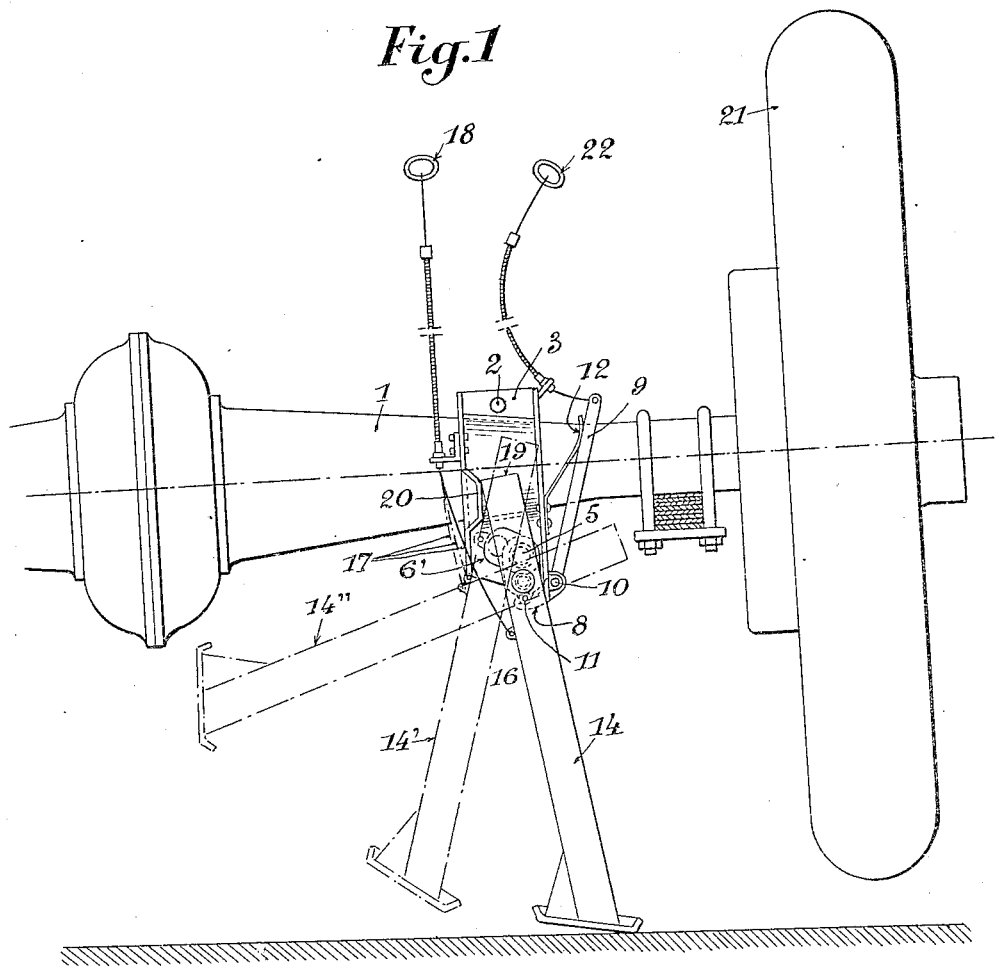
Fig. 1 is an elevational view of a crutch according to my invention secured to a tubular axle.

In the embodiment shown in the appended drawings, a collar is secured upon axle 1 through one or several bolts 2, said collar consisting of a piece 3 having a U-shaped horizontal section (Figs. 2 and 3) to which a second piece 3ª is jointed at 4 (Fig. 3). Pieces 3 and 3ª of the collar are each provided with a semi-cylindrical hollow surface or any other suitable surface conforming in shape to axle 1 (or to any other support to which it may be secured).

Upon said collar is screwed, riveted, bolted, or welded a pivot 5. An arm 6 is adapted to oscillate about said pivot 5 between two extreme positions 6 and 6' (Figs. 1 and 2). Position 6 is the normal position. Said arm is brought back into said position by a spring 7 (Fig. 3) which is for instance disposed about pivot 5, and it is maintained in said position by some locking arrangement. Said locking arrangement may consist, as shown in the drawings, of a hook or pawl 8 carried by a lever 9 pivotally mounted about a stationary axis 10 and connected through a cable 22 to some controlling means operated by hand or otherwise. Said pawl is adapted to engage a cylindrical projection 11 of arm 6. Pawl 8 is maintained in its locking position for instance by means of a spring 12 (Figs 1 and 2).

A solid or tubular crutch 14 is adapted to oscillate about another pivot 13 of arm 6, between two extreme positions 14 and 14″. On the lower end of said crutch is fixed, either permanently or not, either rigidly or in an oscillating manner, a shoe 15. A cable 17 connected to controlling means 18 adapted to be operated by hand or otherwise, is secured to a point 16 of crutch 14. The other end 19 of crutch 14 may be on a line passing through axes 5 and 13, or said crutch may make a certain angle with direction 5—13. Said end 19 is adapted to bear against the sides of the collar or against a boss 20 provided on said side.

The operation of my device is as follows: In ordinary time, control 18 is in a fixed position such that the crutch is in the upper position 14″. Through any suitable means (by means for instance of a jack applied at any suitable point) the wheel is lifted above the ground level H. The wheel is maintained in that position by the jack or any other hoisting means, and the controlling organ 18 is operated in order to release the crutch. Said crutch oscillates about its axis 13 and assumes a vertical position of equilibrium. The hoisting apparatus is then moved down so that the end 15 of the crutch is brought down into contact with the ground H through the intermediary of its shoe (position 14). The end 19 of the crutch is applied against boss 20. The wheel can no longer move down. Equilibrium is established and if crutch 14 has been chosen sufficiently long for preventing the lowest point of tire 21 from touching the ground H when said position of equilibrium is reached, the wheel is free and can be worked upon.

When it is desired to bring tire 21 back into contact with ground H, control 22 is operated in such manner as to rotate lever 9, which carries pawl 8, toward collar 3. Arm 6 is thus released, and, under the action of the load resting upon crutch 14, said arm passes from its position 6 into its position 6′, against the action of spring 7 (Fig. 3). The axis 13 of crutch 14 now occupies position 13′. The crutch is in the position 14′ (Fig. 1) and the wheel is lowered down to the position in which tire 21 is again in contact with ground H. During the rotation of arm 6, crutch 14 bears against boss 20, which causes said crutch to pivot and to raise its shoe 15 from the ground H (position 14″). As soon as no effort is exerted on crutch 14, arm 6 is brought back into its position 6 by spring 7 and is maintained in said position by pawl 8 which is brought back into its locking position by its spring 12. It then suffices to maintain the crutch in position 14″ by means of controlling means 18.

It should be well understood that my invention is not limited to the specific embodiment that I have just described with reference to the accompanying drawings, and which has been shown merely by way of example. According to the case the fixation of the crutch may be ensured by means of a collar, plate, square piece, and the like, which may be bolted, riveted, welded, provided integral with the organ that supports the crutch (axle, spring, frame, or the like). Preferably, the crutch will be removably secured in such manner as to be readily fixed in position.

Preferably all the wheels of the vehicle will be provided with crutches according to my invention. Obviously a single crutch may be used for keeping above the ground the front wheels or the rear wheels of the vehicle, or also the two wheels on the same side of the vehicle.

Owing to these arrangements, the vehicle may be lifted above the ground either wholly or in part with a single jack or any other hoisting apparatus, which is therefore always available.

These devices, which may be operated from a distance, avoid the necessity of reaching points of the vehicle that are not readily accessible, the jack or other lifting apparatus being readily mounted in such manner as to be applied for instance against the axles, the hubs or the rims of the wheels.

What I claim is:

1. A supporting device of the type described for automobiles and other vehicles which comprises in combination, a piece adapted to be rigidly secured to a part of the vehicle, an arm pivoted to said piece, locking means for maintaining said arm in its downward position, elastic means for bringing said arm back to said position, a crutch pivotally mounted on said arm, means for releasing said locking means, and means for maintaining said crutch above the ground.

2. A supporting device of the type described for automobiles and other vehicles which comprises in combination, a piece rigidly secured to a part of the vehicle, an arm pivoted to said piece in a plane at right angles to the longitudinal plane of the vehicle, locking means for maintaining said arm in its downward position, elastic means for bringing said arm back to said position, a crutch pivotally mounted on said arm, means for releasing said locking means, and means for maintaining said crutch above the ground.

3. A supporting device of the type described for automobiles and other vehicles which comprises in combination, a collar rigidly secured in a detachable manner to a part of the vehicle, an arm pivoted to said collar in a plane at right angles to the longitudinal plane of the vehicle, locking means for maintaining said arm in its downward position, elastic means for bringing said arm back to said position, a crutch pivotally mounted on said arm, means for releasing said locking means and means for maintaining said crutch above the ground.

4. A supporting device of the type described for automobiles and other vehicles which comprises in combination, a collar rigidly secured in a detachable manner to a part of the vehicle, a pivot on said collar, an arm adapted to turn about said pivot, means for locking said arm in its downward position, a spring wound about said pivot adapted to bring said arm back to said position, a crutch pivotally mounted on said arm, means for releasing said locking means, and means for maintaining said crutch above the ground.

5. A supporting device of the type described for automobiles and other vehicles which comprises in combination, a collar rigidly secured in a detachable manner to a part of said vehicle, a pivot on said collar, an arm adapted to turn about said pivot, a projection on said arm, a lever pivotally mounted on said collar, a pawl on said lever adapted to engage said projection, a spring for bringing said lever back into its locking position for which the arm is maintained in its downward position, a spring wound about said pivot adapted to bring said arm back to said position, a crutch pivotally mounted on said arm, means for rotating said lever so that said pawl is brought out of engagement with said projection, and means for maintaining said crutch above the ground.

6. A supporting device of the type described for automobiles and other vehicles which comprises in combination, a collar rigidly secured in a detachable manner to a part of said vehicle, a pivot on said collar, an arm adapted to turn about said pivot, a projection on said arm, a lever pivotally mounted on said collar, a pawl on said lever adapted to engage said projection, a spring for bringing said lever back into its locking position for which the arm is maintained in its downward position, a spring wound about said pivot adapted to bring said arm back to said position, a crutch pivotally mounted on said arm, a boss on said collar adapted to cooperate with the upper end of said crutch, means for rotating said lever in such manner that said pawl is brought out of engagement with said projection, and means for maintaining said crutch above the ground.

In testimony whereof I have signed my name to this specification.

ABEL JEAN MARIE GARNIER.